(12) United States Patent
Alvarado et al.

(10) Patent No.: US 11,110,654 B2
(45) Date of Patent: Sep. 7, 2021

(54) SYSTEM AND PRINT HEAD FOR CONTINUOUSLY MANUFACTURING COMPOSITE STRUCTURE

(71) Applicant: CC3D LLC, Coeur d'Alene, ID (US)

(72) Inventors: Tyler B. Alvarado, Coeur d'Alene, ID (US); Trevor David Budge, Coeur d'Alene, ID (US); Ryan C. Stockett, Spokane, WA (US)

(73) Assignee: Continuous Composites Inc., Coeur d'Alene, ID (US)

( * ) Notice: Subject to any disclaimer, the term of this patent is extended or adjusted under 35 U.S.C. 154(b) by 220 days.

(21) Appl. No.: 16/279,354

(22) Filed: Feb. 19, 2019

(65) Prior Publication Data

US 2019/0315054 A1 Oct. 17, 2019

Related U.S. Application Data

(60) Provisional application No. 62/656,866, filed on Apr. 12, 2018.

(51) Int. Cl.
*B29C 64/188* (2017.01)
*B29C 64/307* (2017.01)
(Continued)

(52) U.S. Cl.
CPC .......... *B29C 64/188* (2017.08); *B29C 64/118* (2017.08); *B29C 64/209* (2017.08); *B29C 64/307* (2017.08); *B29C 64/321* (2017.08); *B33Y 10/00* (2014.12); *B33Y 30/00* (2014.12); *B33Y 40/00* (2014.12)

(58) Field of Classification Search
CPC ... B29C 64/188; B29C 64/321; B29C 64/118; B29C 64/307; B29C 64/209; B29C 64/314; B29C 70/16; B29C 70/384; B33Y 30/00; B33Y 10/00; B33Y 40/00; B33Y 70/00
See application file for complete search history.

(56) References Cited

U.S. PATENT DOCUMENTS 3,286,305 A 11/1966 Seckel
3,809,514 A 5/1974 Nunez
(Continued)

FOREIGN PATENT DOCUMENTS

CN 106863772 A 6/2017
DE 4102257 A1 7/1992
(Continued)

OTHER PUBLICATIONS

International Search Report dated May 29, 2019 for PCT/US2019/018973 to CC3D LLC Filed Feb. 21, 2019.
(Continued)

*Primary Examiner* — Jacob T Minskey
*Assistant Examiner* — S. Behrooz Ghorishi
(74) *Attorney, Agent, or Firm* — Ryan C. Stockett

(57) ABSTRACT

A system is disclosed for use in additively manufacturing a composite structure. The system may include a head configured to discharge a continuous reinforcement. The system may further include an external applicator configured to apply a matrix to the discharged continuous reinforcement, and a cure enhancer configured to expose the matrix to a cure energy at a side of the external applicator opposite the head.

3 Claims, 3 Drawing Sheets

(51) Int. Cl.
  B29C 64/209 (2017.01)
  B29C 64/321 (2017.01)
  B29C 64/118 (2017.01)
  B33Y 30/00 (2015.01)
  B33Y 10/00 (2015.01)
  B33Y 40/00 (2020.01)

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2008/0317894 A1* | 12/2008 | Turley ............... B29C 48/27 425/226 |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0136455 A1 | 5/2015 | Fleming |
| 2015/0165691 A1* | 6/2015 | Mark .................. B29C 64/386 700/98 |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1* | 4/2016 | Schirtzinger ......... B29C 64/147 428/411.1 |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |

(56) References Cited

U.S. PATENT DOCUMENTS

| | | | |
|---|---|---|---|
| 2017/0028644 A1 | 2/2017 | Evans et al. | |
| 2017/0030207 A1 | 2/2017 | Kittleson | |
| 2017/0036403 A1 | 2/2017 | Ruff et al. | |
| 2017/0050340 A1 | 2/2017 | Hollander | |
| 2017/0057164 A1 | 3/2017 | Hemphill et al. | |
| 2017/0057165 A1 | 3/2017 | Waldrop et al. | |
| 2017/0057167 A1 | 3/2017 | Tooren et al. | |
| 2017/0057181 A1 | 3/2017 | Waldrop et al. | |
| 2017/0064840 A1 | 3/2017 | Espalin et al. | |
| 2017/0066187 A1 | 3/2017 | Mark et al. | |
| 2017/0087768 A1 | 3/2017 | Bheda | |
| 2017/0106565 A1 | 4/2017 | Braley et al. | |
| 2017/0106594 A1* | 4/2017 | Gardiner | B29C 64/118 |
| 2017/0120519 A1 | 5/2017 | Mark | |
| 2017/0129170 A1 | 5/2017 | Kim et al. | |
| 2017/0129171 A1 | 5/2017 | Gardner et al. | |
| 2017/0129176 A1 | 5/2017 | Waatti et al. | |
| 2017/0129182 A1 | 5/2017 | Sauti et al. | |
| 2017/0129186 A1 | 5/2017 | Sauti et al. | |
| 2017/0144375 A1 | 5/2017 | Waldrop et al. | |
| 2017/0151728 A1 | 6/2017 | Kunc et al. | |
| 2017/0157828 A1 | 6/2017 | Mandel et al. | |
| 2017/0157831 A1 | 6/2017 | Mandel et al. | |
| 2017/0157844 A1 | 6/2017 | Mandel et al. | |
| 2017/0157851 A1 | 6/2017 | Nardiello et al. | |
| 2017/0165908 A1 | 6/2017 | Pattinson et al. | |
| 2017/0173868 A1 | 6/2017 | Mark | |
| 2017/0182712 A1 | 6/2017 | Scribner et al. | |
| 2017/0210074 A1 | 7/2017 | Ueda et al. | |
| 2017/0217088 A1 | 8/2017 | Boyd et al. | |
| 2017/0232674 A1 | 8/2017 | Mark | |
| 2017/0259502 A1 | 9/2017 | Chapiro et al. | |
| 2017/0259507 A1 | 9/2017 | Hocker | |
| 2017/0266876 A1 | 9/2017 | Hocker | |
| 2017/0274585 A1 | 9/2017 | Armijo et al. | |
| 2017/0284876 A1 | 10/2017 | Moorlag et al. | |
| 2018/0201021 A1* | 7/2018 | Beaver | B41J 2/1721 |
| 2019/0202000 A1* | 7/2019 | Di Domenico | B23K 15/0086 |

FOREIGN PATENT DOCUMENTS

| | | |
|---|---|---|
| EP | 2589481 B1 | 1/2016 |
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2015139095 A1 | 9/2015 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-805 (May 15, 2012).

* cited by examiner

US 11,110,654 B2

SYSTEM AND PRINT HEAD FOR CONTINUOUSLY MANUFACTURING COMPOSITE STRUCTURE

RELATED APPLICATIONS

This application is based on and claims the benefit of priority from U.S. Provisional Application No. 62/656,866 that was filed on Apr. 12, 2018, the contents of which are expressly incorporated herein by reference.

TECHNICAL FIELD

The present disclosure relates generally to a manufacturing system and, more particularly, to a system and print head for continuously manufacturing composite structures.

BACKGROUND

Continuous fiber 3D printing (a.k.a., CF3D™) involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a head-mounted cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although CF3D™ provides for increased strength, compared to manufacturing processes that do not utilize continuous fiber reinforcement, improvements can be made to the structure and/or operation of existing systems. The disclosed additive manufacturing system is uniquely configured to provide these improvements and/or to address other issues of the prior art.

SUMMARY

In one aspect, the present disclosure is directed to a system for additively manufacturing a composite structure. The system may include a head configured to discharge a continuous reinforcement. The system may further include an external applicator configured to apply a matrix to the discharged continuous reinforcement, and a cure enhancer configured to expose the matrix to a cure energy at a side of the external applicator opposite the head.

In another aspect, the present disclosure is directed to another system for additively manufacturing a composite structure. This system may include a head configured to discharge a matrix-wetted continuous reinforcement, and a primary cure enhancer configured to expose the matrix-wetted continuous reinforcement to a cure energy. The system may further include an external applicator configured to discharge additional matrix onto the matrix-wetted continuous reinforcement at a location downstream of the primary cure enhancer, and an auxiliary cure enhancer configured to expose the additional matrix to additional cure energy.

DETAILED DESCRIPTION

Figure 1:
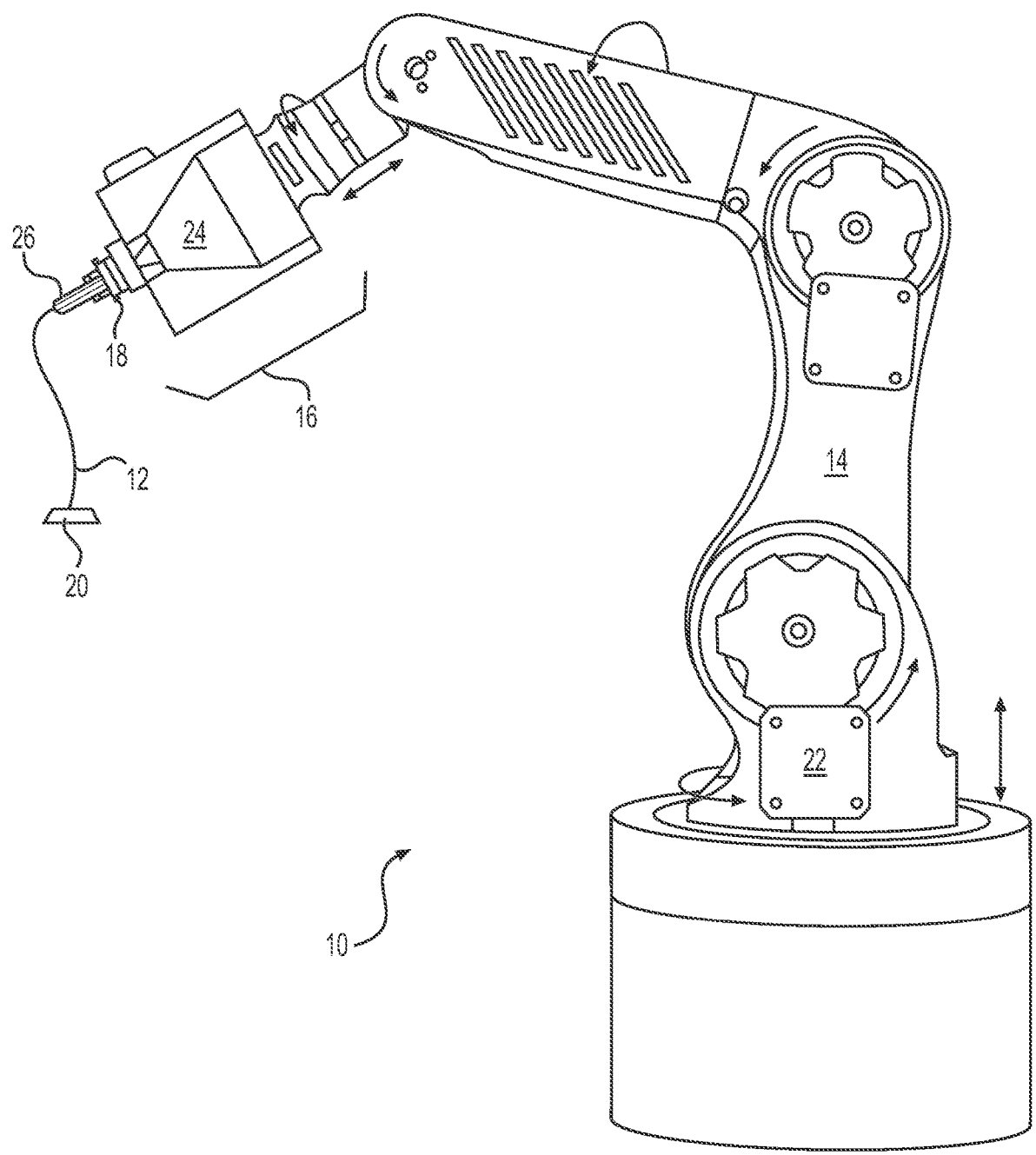
FIG. 1 is diagrammatic illustration of an exemplary disclosed additive manufacturing system.

FIG. 1 illustrates an exemplary system 10, which may be used to continuously manufacture composite structures 12 having any desired cross-sectional shape (e.g., circular, rectangular, or polygonal). System 10 may include at least a support 14 and a head 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis (e.g., a trajectory) of structure 12 is three-dimensional. Support 14 may alternatively embody an overhead gantry or a hybrid gantry/arm also capable of moving head 16 in multiple directions during fabrication of structure 12. Although support 14 is shown as being capable of 6-axis movements, it is contemplated that any other type of support 14 capable of moving head 16 in the same or a different manner could also be utilized. In some embodiments, a drive may mechanically couple head 16 to support 14, and include components that cooperate to move portions of and/or supply power to head 16.

Head 16 may be configured to receive or otherwise contain a matrix material. The matrix material may include any type of matrix material (e.g., a liquid resin, such as a zero-volatile organic compound resin, a powdered metal, etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside head 16 may be pressurized, for example by an external device (e.g., by an extruder or another type of pump—not shown) that is fluidly connected to head 16 via a corresponding conduit (not shown). In another embodiment, however, the pressure may be generated completely inside of head 16 by a similar type of device. In yet other embodiments, the matrix material may be gravity-fed into and/or through head 16. For example, the matrix material may be fed into head 16, and pushed or pulled out of head 16 along with one or more continuous reinforcements. In some instances, the matrix material inside head 16 may need to be kept cool and/or dark in order to inhibit premature curing or otherwise obtain a desired rate of curing after discharge. In other instances, the matrix material may need to be kept warm for similar reasons. In either situation, head 16 may be specially configured (e.g., insulated, temperature-controlled, shielded, etc.) to provide for these needs.

The matrix material may be used to coat any number of continuous reinforcements (e.g., separate fibers, tows, rovings, socks, and/or sheets of continuous material) and, together with the reinforcements, make up a portion (e.g., a wall) of composite structure 12. The reinforcements may be stored within or otherwise passed through head 16. When multiple reinforcements are simultaneously used, the reinforcements may be of the same material composition and have the same sizing and cross-sectional shape (e.g., circular, square, rectangular, etc.), or a different material composition with different sizing and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that are at least partially encased in the matrix material discharging from head 16.

The reinforcements may be exposed to (e.g., at least partially coated with) the matrix material while the reinforcements are inside head 16, while the reinforcements are being passed to head 16, and/or while the reinforcements are discharging from head 16. The matrix material, dry reinforcements, and/or reinforcements that are already exposed to the matrix material may be transported into head 16 in any manner apparent to one skilled in the art. In some embodiments, a filler material (e.g., chopped fibers) may be mixed with the matrix material before and/or after the matrix material coats the continuous reinforcements.

One or more primary cure enhancers (e.g., a UV light, an ultrasonic emitter, a laser, a heater, a catalyst dispenser, a chiller, etc.) 18 may be mounted proximate (e.g., within, on, or adjacent) head 16 and configured to enhance a cure rate and/or quality of the matrix material as it is discharged from head 16. Cure enhancer 18 may be controlled to selectively expose portions of structure 12 to energy (e.g., UV light, electromagnetic radiation, vibrations, heat, a chemical catalyst, a chilled medium, etc.) during the formation of structure 12. The energy may increase a rate of chemical reaction occurring within the matrix material, sinter the material, harden the material, or otherwise cause the material to cure as it discharges from head 16. The amount of energy produced by cure enhancer 18 may be sufficient to cure the matrix material before structure 12 axially grows more than a predetermined length away from head 16. In one embodiment, structure 12 is completely cured before the axial growth length becomes equal to an external diameter of the matrix coated reinforcement.

The matrix material and/or reinforcement may be discharged from head 16 via at least two different modes of operation. In a first mode of operation, the matrix material and/or reinforcement are extruded (e.g., pushed under pressure and/or mechanical force) from head 16 as head 16 is moved by support 14 to create the 3-dimensional trajectory within a longitudinal axis of structure 12. In a second mode of operation, at least the reinforcement is pulled from head 16, such that a tensile stress is created in the reinforcement during discharge. In this mode of operation, the matrix material may cling to the reinforcement and thereby also be pulled from head 16 along with the reinforcement, and/or the matrix material may be discharged from head 16 under pressure along with the pulled reinforcement. In the second mode of operation, where the matrix material is being pulled from head 16 with the reinforcement, the resulting tension in the reinforcement may increase a strength of structure 12 (e.g., by aligning the reinforcements, inhibiting buckling, equally distributing loads, etc.), while also allowing for a greater length of unsupported structure 12 to have a straighter trajectory. That is, the tension in the reinforcement remaining after curing of the matrix material may act against the force of gravity (e.g., directly and/or indirectly by creating moments that oppose gravity) to provide support for structure 12.

The reinforcement may be pulled from head 16 as a result of head 16 moving away from an anchor point 20. In particular, at the start of structure formation, a length of matrix-impregnated reinforcement may be pulled and/or pushed from head 16, deposited onto anchor point 20, and cured such that the discharged material adheres (or is otherwise coupled) to anchor point 20. Thereafter, head 16 may be moved away from anchor point 20, and the relative movement may cause the reinforcement to be pulled from head 16. It should be noted that the movement of reinforcement through head 16 could be assisted (e.g., via internal head mechanisms), if desired. However, the discharge rate of reinforcement from head 16 may primarily be the result of relative movement between head 16 and anchor point 20, such that tension is created within the reinforcement. It is contemplated that anchor point 20 could be moved away from head 16 instead of or in addition to head 16 being moved away from anchor point 20.

A controller 22 may be provided and communicatively coupled with support 14, head 16, and any number of cure enhancers 18. Each controller 22 may embody a single processor or multiple processors that are configured to control an operation of system 10. Controller 22 may include one or more general or special purpose processors or microprocessors. Controller 22 may further include or be associated with a memory for storing data such as, for example, design limits, performance characteristics, operational instructions, tool paths, and corresponding parameters of each component of system 10. Various other known circuits may be associated with controller 22, including power supply circuitry, signal-conditioning circuitry, solenoid driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of lookup tables, graphs, and/or equations. In the disclosed embodiment, the maps may be used by controller 22 to determine the movements of head 16 required to produce the desired size, shape, and/or contour of structure 12, and to regulate operation of cure enhancers 18 in coordination with the movements.

Figure 2:
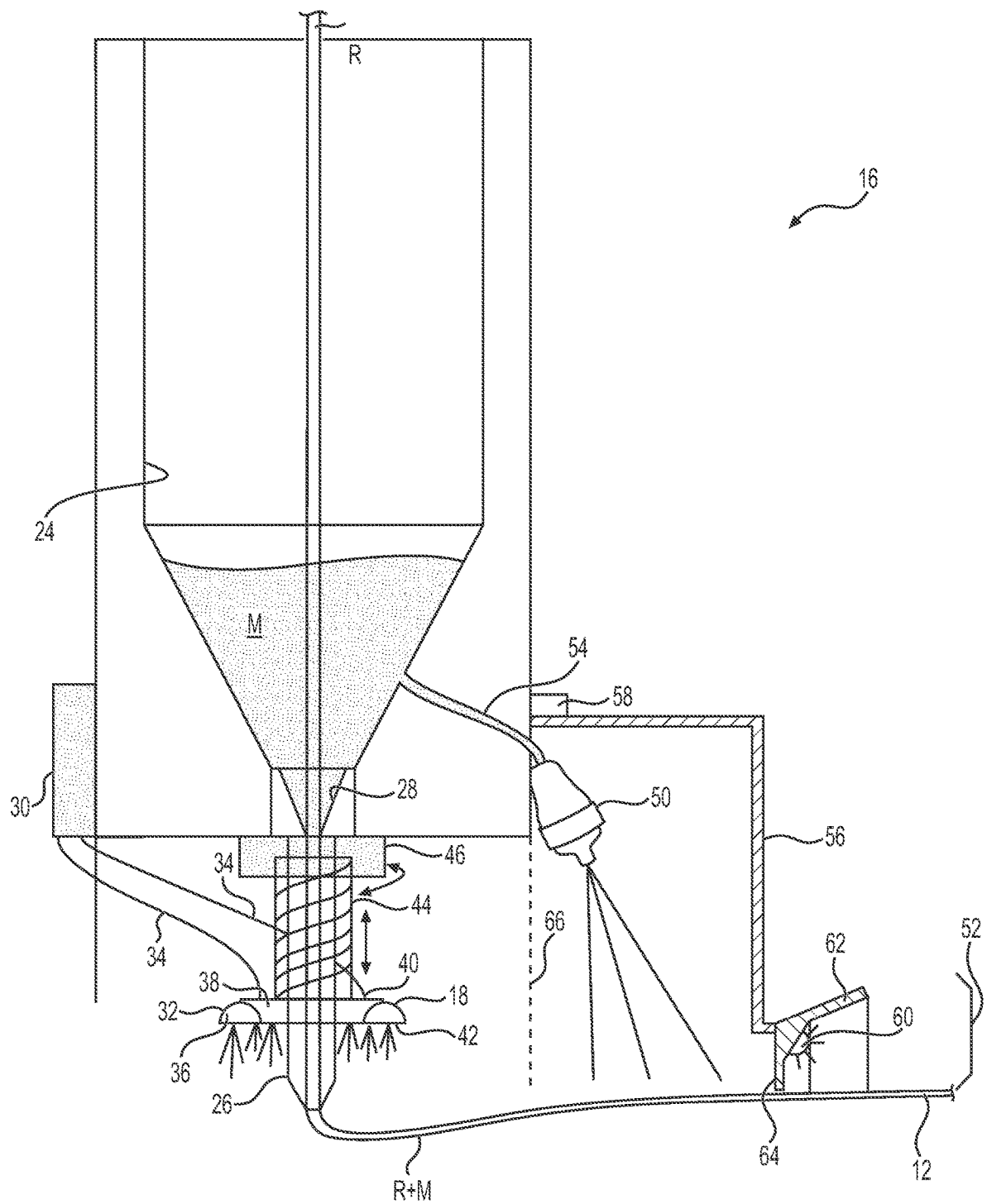
FIGS. 2 and 3 are diagrammatic illustrations of exemplary disclosed print heads that may be used in conjunction with the additive manufacturing system of FIG. 1.

As shown in FIG. 2, head 16 may be an assembly of multiple components that cooperate to discharge matrix-coated reinforcements (shown as R+M in FIG. 2). These components may include, among other things, a matrix reservoir 24 and a nozzle 26 that communicates with an internal volume of matrix reservoir 24 via a central (e.g., tapered) opening 28. The internal volume of matrix reservoir 24 may hold a finite supply of matrix that is sufficient to fully wet reinforcements passing therethrough at a specified (e.g., maximum) travel rate. In the depicted example, nozzle 26 is single-path nozzle configured to discharge composite material having a generally circular or rectangular cross-section. The configuration of head 16, however, may allow nozzle 26 to be swapped out for another nozzle (not shown) that discharges composite material having a different shape (e.g., a ribbon- or sheet-like cross-section).

Figure 3:
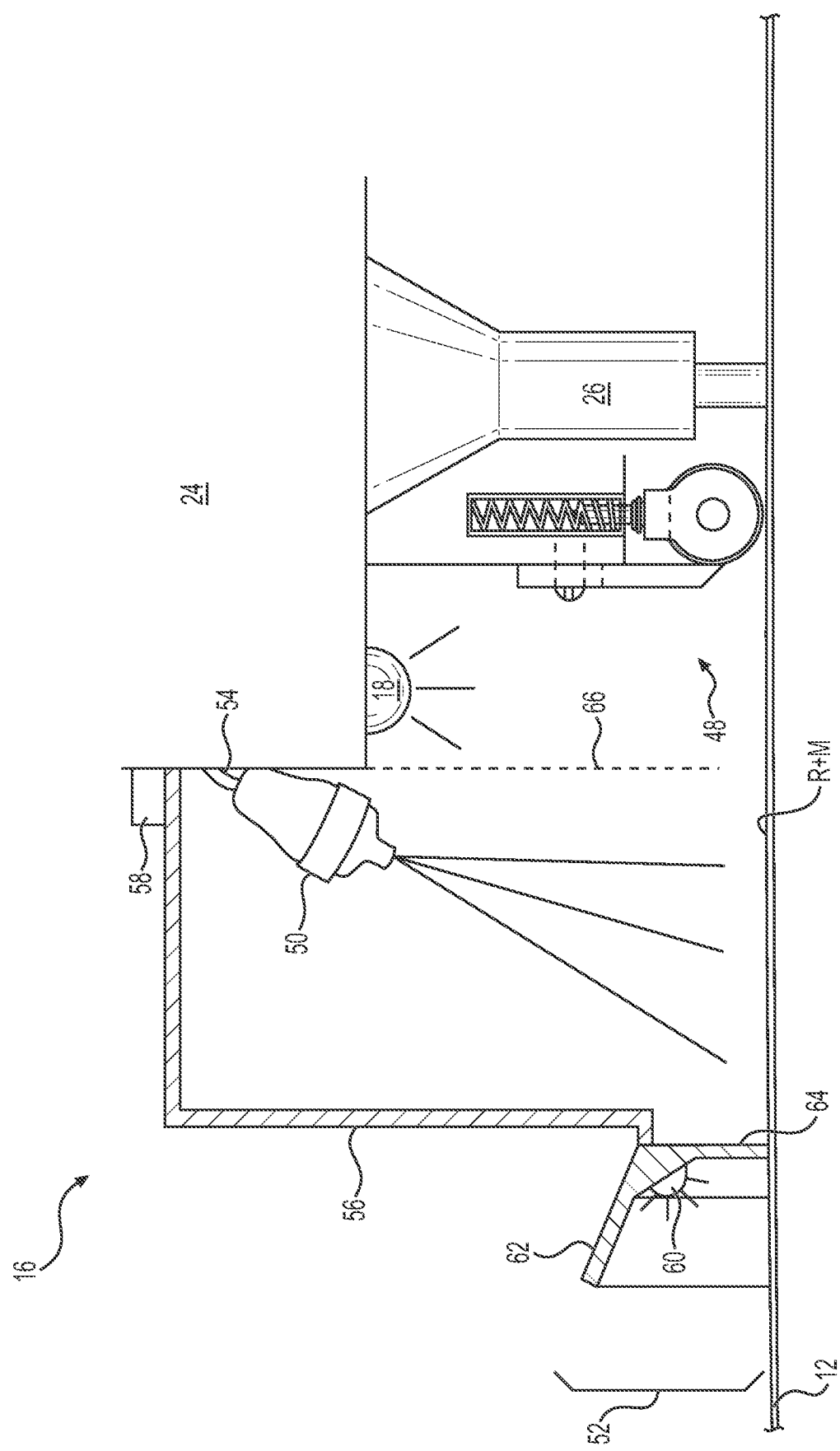

Cure enhancer(s) 18 may be mounted at the discharge end of matrix reservoir 24 and adjacent (e.g., at a trailing side of or around) nozzle 26. Different exemplary embodiments of cure enhancers 18 are shown in FIGS. 2 and 3. In the embodiment of FIG. 2, cure enhancer 18 includes, among other things, an energy source 30, a modifier 32, and one or more transmitters 34 that extend from energy source 30 to modifier 32. Cure energy may be generated by energy source 30 and directed via transmitter(s) 34 to modifier 32. Modifier 32 may then modify the energy in any number of different ways, prior to the energy reaching the matrix within the discharging material of structure 12.

Energy source 30 may be located remotely from modifier 32. In one embodiment, energy source 30 is a UV generator mounted to head 16 (e.g., to a side, top, and/or bottom of matrix reservoir 24). It is contemplated, however, that energy source 30 could be an ultrasonic generator, an infrared heat generator, a microwave generator, a laser generator, or another type of energy generator that is mounted to head 16. It is further contemplated that energy source 30 could alternatively be mounted to support 14 and/or to an enclosure in which support 14 and/or head 16 is located, if desired. It is contemplated that, in an alternative embodiment, energy source 30 could be a negative source (e.g., configured to chill the resin), if desired.

Modifier 32 may be configured to amplify, diffuse, focus, reflect, aim, and/or otherwise condition the energy generated by energy source 30. In the embodiment of FIG. 2, modifier 32 is a diffuser configured to evenly distribute the energy from energy source 30 around a tip end of nozzle 26. As a diffuser, modifier 32 may include a hemi-toroidally shaped body having a generally reflective inner surface 36 and a generally opaque outer surface 38. The body of modifier 32 may at least partially (e.g., completely) surround nozzle 26, and include one or more energy entrance(s) 40 through which energy is received and one or more (e.g., a single) energy outlet(s) 42 through which energy is discharged. In the disclosed embodiment, energy entrance(s) 40 may be circular openings or transparent surfaces at which transmitter(s) 34 terminate. In some applications, baffles, lenses, prisms, filters, and/or other similar devices may be situated within energy entrance(s) 40 to help condition the energy within the body of modifier 32. Energy outlet(s) 42 may be generally ring-shaped, and oriented generally orthogonal to (or tilted inward or outward relative to) an axis of nozzle 26. It is contemplated that baffles, lenses, prisms, filters, and/or other similar devices may be situated within energy outlet(s) 42, if desired. In addition, modifier 32 could, itself, be an optic. In this example transmitters 34 may channel UV light into the back of the optic, and the optic may both amplify and diffuse the light into a cone.

Transmitters 34 may be configured to transmit energy from energy source 30 into modifier 32. In the disclosed embodiment, transmitters 34 are flexible light pipes (e.g., optical tubes) that are configured to transmit UV light. It is contemplated, however that other types of transmitters 34 (acoustic pipes, electronic and/or magnetic transmission lines, etc.) may be used, if desired.

In one embodiment, a position and/or orientation of modifier 32 may be selectively adjusted. For example, an axial location and/or tilt angle of energy outlet(s) 42 may be varied with respect to a tip end and/or an axis of nozzle 26. In one example, an actuator (e.g., a lead screw 44 and motor 46) may be connected to the body of modifier 32 and selectively activated by controller 22 (referring to FIG. 1) to cause the body to be raised, lowered, and/or tilted. Any type of actuator (e.g., an electric rotary actuator, a pneumatic linear actuator, a hydraulic link, etc.) may be disposed between modifier 32 and any other component of head 16 to cause desired movements of modifier 32.

A simpler embodiment of cure enhancer 18 is illustrated in FIG. 3. In this embodiment, cure enhancer 18 includes one or more energy discharging devices (e.g., UV lights) that are mounted to head 16 (e.g., directly to a lower end of matrix reservoir 24) at a trailing side of nozzle 26. In the example of FIG. 3, a compactor 48 is located between cure enhancer 18 and nozzle 26. It is contemplated that compactor 48 could be used in conjunction with the embodiment of FIG. 2 as well, if desired.

In some embodiments, head 16 may additionally include an external matrix applicator 50 and an auxiliary cure enhancer 52 that trails behind external matrix applicator 50. With this arrangement, matrix (e.g., all of the matrix or only supplemental matrix) may be applied by applicator 50 after the reinforcement (e.g. dry reinforcement, fully wetted reinforcement, and/or partially wetted reinforcement) has been discharged from nozzle 26. And auxiliary cure enhancer 52 may be used to at least partially cure the additional matrix discharged by applicator 50.

In the disclosed embodiment, matrix applicator 50 is a spray-type applicator (e.g., a jet) that is configured to spray matrix onto an outer surface of the already-deposited reinforcement. It is contemplated, however, that another type of applicator (e.g., a drip-type applicator, a brush-type applicator, a roller-type applicator, etc.—not shown) could alternatively be used, if desired. In one example, matrix applicator 50 is connected to receive matrix from reservoir 24 (e.g., via an internal passage 54). In another example (not shown), the matrix could additionally or alternatively be received from another location (e.g., from an offboard pump or reservoir) via an external passage (not shown). The matrix may be pressurized prior to receipt by applicator 50, pressurized by applicator 50 itself (e.g., via internal pistons, turbines, or other mechanical devices), and/or pressurized by another source (e.g., by air also directed into applicator 50).

Auxiliary cure enhancer 52 may be located downstream of matrix applicator 50, relative to a travel direction of head 16. In some embodiments, auxiliary cure enhancer 52 may be configured to move (e.g., to pivot around nozzle 26) in order to maintain this relationship during cornering by head 16. For example, auxiliary cure enhancer 52 may be mounted to an arm 56, and an actuator 58 (e.g., a rotary actuator such as a channel-mounted motor or gear train) may connect arm 56 to head 16. Controller 22 (referring to FIG. 1) may selectively enable (e.g., energize or unlock) actuator 58 to cause corresponding rotation of auxiliary cure enhancer 52. Auxiliary cure enhancer 52 may include one or more energy sources (e.g., UV lights, acoustic generators, heaters, microwave generators, lasers, etc.) 60 that are at least partially enclosed within a hood 62. Hood 62 may flare outward and extend downstream to reflect energy from energy source(s) 60 inward toward structure 12, such that premature curing of the matrix being sprayed by applicator 50 is avoided. It is contemplated that hood 62 could be omitted, if desired. Like primary cure enhancer 30, it is contemplated that in an alternative embodiment, auxiliary cure enhancer 52 could be a source of negative energy, if desired.

Matrix applicator 50 may be configured to discharge matrix against the outer surface of structure 12 (e.g., the uncured, cured, or partially cured surface), such that the matrix fills voids within and/or sticks to the surfaces of structure 12. In one embodiment, a squeegee 64 may be associated with applicator 50 and/or auxiliary cure enhancer 52 and configured to wipe over and thereby smooth out the applied matrix prior to energy exposure by energy source(s) 60. Squeegee 64 may screed the liquid matrix into a smooth layer having a consistent thickness (e.g., within engineering tolerances). It is contemplated that squeegee 64 may have a width about the same as a width of material being discharged from nozzle 26, or a greater width such that multiple adjacent tracks of material (e.g., the discharging track and one or more previously discharged tracks) are wiped over by squeegee 64.

In some embodiments, care may be taken to ensure that the matrix discharged by applicator 50 is not cured (e.g., by enhancer(s) 18) prematurely (e.g., before being wiped over by squeegee 64). In these embodiments, a shadowing mechanism (e.g., a curtain) 66 may be placed at a transition location between cure enhancer(s) 18 and applicator 50.

INDUSTRIAL APPLICABILITY

The disclosed systems may be used to continuously manufacture composite structures having any desired cross-sectional shape and length. The composite structures may include any number of different fibers of the same or different types and of the same or different diameters, and any number of different matrixes of the same or different makeup. Operation of system 10 will now be described in detail.

At a start of a manufacturing event, information regarding a desired structure 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired surface textures, texture locations, etc. It should be noted that this information may alternatively or additionally be loaded into system 10 at different times and/or continuously during the manufacturing event, if desired. Based on the component information, one or more different reinforcements and/or matrix materials may be selectively installed and/or continuously supplied into system 10. In some embodiments, the reinforcements may also need to be connected to a pulling machine (not shown) and/or to a mounting fixture (e.g., to an anchor point). Installation of the matrix material may include filling head 16 and/or coupling of an extruder (not shown) to head 16.

The component information may then be used to control operation of system 10. For example, the reinforcements may be pulled and/or pushed along with the matrix material from head 16. Support 14 may also selectively move head 16 and/or anchor point 20 in a desired manner, such that an axis of the resulting structure 12 follows a desired three-dimensional trajectory. Once structure 12 has grown to a desired length, structure 12 may be severed from system 10.

It will be apparent to those skilled in the art that various modifications and variations can be made to the disclosed systems. Other embodiments will be apparent to those skilled in the art from consideration of the specification and practice of the disclosed system. For example, it is contemplated that the matrix discharged by applicator 50 may be the same matrix as or different from the matrix passing through nozzle 26. It is also contemplated that squeegee 64 could be replaced with another device (e.g., gas jets) that function in similar manner to smooth out the surface matrix. It is intended that the specification and examples be considered as exemplary only, with a true scope being indicated by the following claims and their equivalents.

What is claimed is:

1. A system for additively manufacturing a composite structure, comprising:
    a nozzle configured to discharge a continuous reinforcement;
    an external applicator operatively attached to the nozzle and configured to move with the nozzle and apply a matrix to the continuous reinforcement during discharging of the continuous reinforcement from the nozzle; and
    a cure enhancer operatively attached to the nozzle and configured to expose the matrix to a cure energy at a side of the external applicator opposite the nozzle to harden the matrix,
    wherein the cure enhancer includes:
        an energy source;
        a modifier located remotely from the energy source; and
        at least one transmitter extending from the energy source to the modifier; and
    wherein the modifier at least partially encircles the nozzle.

2. The system of claim 1, wherein the modifier is a hemi-toroidally shaped body.

3. The system of claim 1, further including an actuator configured to adjust at least one of a position and an orientation of the modifier.

* * * * *